UNITED STATES PATENT OFFICE.

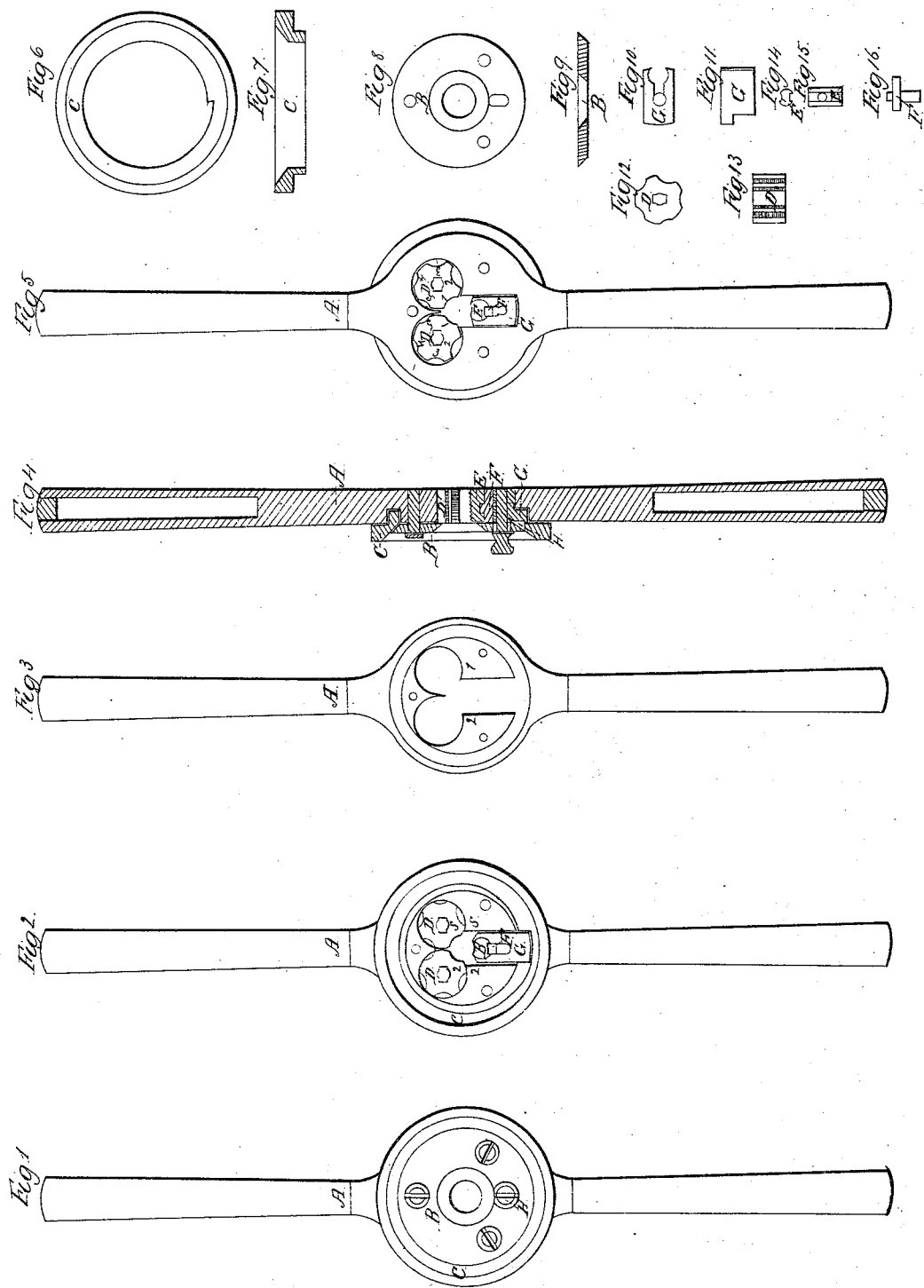

SIMEON GOODFELLOW, OF NEW ORLEANS, LOUISIANA.

ARRANGEMENT OF SCREW-CUTTING DIES IN THE DIE-STOCK.

Specification of Letters Patent No. 10,293, dated December 6, 1853.

*To all whom it may concern:*

Be it known that I, SIMEON GOODFELLOW, of New Orleans, in the parish of Orleans and State of Louisiana, have invented a new and useful Improvement in Stocks and Dies for Cutting Bolts and Screws; and I do hereby declare that the following is a full and exact description.

In attempting a description of my invention I would first say that by the term or word "cutting" (used in the title) I mean threading or shaping the threads I have adopted the word (cutting) therefore as it applies in this instance and in agreement with custom.

The improvement as set forth consists in the adaption to a purpose for cutting bolts and screws with circular dies and cutters graduated to different sizes as indicated by numbers thereon.

Figure 1 of the accompanying drawings gives a top surface or bird's eye view of the stock A with its appendages. In the stock A are inserted two circular reversible dies D, D, made a little tapering from their upper surface downward, also a rectangular die tapered in the same direction (downward) having a cross-head key passing lengthwise and centrally through it—the head of the key F (with a small nipple) fitting into a groove and a small hole near the center of the groove in the small circular die or cutter E and pointing to a center between the two circular reversible dies D, D, Fig. 2.

The same letters refer to like parts in different figures.

C is a ring with a projection on one side turned to fit a circular groove in the stock A with part fitting the groove graduated to the shape of a wedge bent around with its slant side inward. This ring is a useful substitute for the screw for forcing the rectangular die and is more convenient and compact as applied here.

B is a thin circular plate or washer beveled on its rim or periphery to form a joint with the ring C on its upper bevel surface and is secured to the upper flat surface of stock A by three small screws passing through them, thus securely holding the ring C in its place and the dies each in their true relative positions as placed. The handles are drilled each several inches to be used as receptacles for the small cutters, any additional number of which can be supplied when required at a very small expense, and are provided each with a short screw to keep in the contents.

Fig. 1 is a top surface or bird's-eye view of the stock with its appendages. Fig. 2 is a bird's-eye view of the stock with guard plate or washer B removed. Fig. 3, the naked stock. Fig. 4 is a longitudinal sectional view of stock and dies. Fig. 5 is a bird's-eye view of stock and dies, inverted. The remaining figures show in detail the component parts in plan and section.

Each small circular die or cutter (in turn) is secured during the process of graduating the circular dies D, D, by means of a screw H, which passes through a slot in the washer or guard plate B, the rectangular die G and the stem of the cross head key F serving the twofold purpose of holding the key to the die or cutter and for drawing back the die, when required. Subsequently to the dies being graduated, cut and numbered and previous to their being tempered the small circular cutters are widened a little in their grooves to allow of their turning a little in their socket in the rectangular die G so that with the turning of stock A backward or forward in the operation of cutting a bolt or screw assumes a position for cutting with the best effect which for bolts of large caliber obviates a great amount of friction due to dies of the ordinary kind, and that while one plate and one set of dies and cutters are suited to a greater number of sizes will perform with ease the cutting of the largest size assigned while the apparatus is not any too large or unwieldy for the smallest. Another important item in the improvement is that any number of small cutters can be added and kept in readiness as extras that in case any one cutter should fail or by long continued use should become blunt another cutter is inserted having a perfect thread thus avoiding the necessity of drawing the temper of all the dies and the consequent labor and expense of recutting and rehardening.

What I claim as my invention and desire to secure by Letters Patent is—

The arrangement of the circular dies, having threaded scores or recesses in their periphery of various depths, or sizes in the die stock substantially as herein described.

SIMEON GOODFELLOW.

Witnesses:
JOHN G. THOMAS,
WM. MCCULLOCH.